US005768081A

United States Patent [19]

Cohen et al.

[11] Patent Number: 5,768,081

[45] Date of Patent: *Jun. 16, 1998

[54] MODULAR PRIMARY SURGE PROTECTOR ASSEMBLY

[75] Inventors: Richard L. Cohen, Novato; Chris Ducey, Woodacre, both of Calif.

[73] Assignee: Panamax Corporation, San Rafael, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 618,250

[22] Filed: Mar. 18, 1996

[51] Int. Cl.[6] .......... H02H 1/00

[52] U.S. Cl. .......... 361/119; 361/111; 361/56; 361/118

[58] Field of Search .......... 361/56, 57, 58, 361/117, 118, 119, 624, 648, 675, 111; 174/48, 72 B, 68.2, 78, 79, 80, 99 B

[56] References Cited

U.S. PATENT DOCUMENTS

| | | | |
|---|---|---|---|
| 4,249,224 | 2/1981 | Baumbach | 361/124 |
| 4,317,154 | 2/1982 | Passarella | 361/119 |
| 4,389,695 | 6/1983 | Carpenter, Jr. | 361/55 |
| 4,438,477 | 3/1984 | Cawley | 361/119 |
| 4,642,733 | 2/1987 | Schacht | 361/363 |
| 4,698,721 | 10/1987 | Warren | 361/110 |
| 4,742,541 | 5/1988 | Cwirzen et al. | 379/412 |
| 4,835,650 | 5/1989 | Epstein | 361/56 |
| 4,882,647 | 11/1989 | Collins | 361/119 |
| 4,918,565 | 4/1990 | King | 361/119 |
| 4,922,374 | 5/1990 | Mueller et al. | 361/119 |
| 5,177,782 | 1/1993 | Henderson et al. | 379/412 |
| 5,216,569 | 6/1993 | Brookhiser | 361/107 |
| 5,224,013 | 6/1993 | Pagliuca | 361/119 |
| 5,278,720 | 1/1994 | Bird | 361/119 |
| 5,410,443 | 4/1995 | Pelegris | 361/119 |
| 5,543,999 | 8/1996 | Riley | 361/119 |
| 5,555,153 | 9/1996 | Frederiksen et al. | 361/119 |

OTHER PUBLICATIONS

Panamax, "Complete Power Protection" sales brochure, undated (no date).

Panamax "My customer got zapped . . ." sales brochure, Jan. 1994.

*Primary Examiner*—Jeffrey A. Gaffin
*Assistant Examiner*—S. Jackson
*Attorney, Agent, or Firm*—Limbach & Limbach, LLP

[57] ABSTRACT

A modular primary surge protector assembly where various detachably connectable modules provide primary surge protection for different types of electrical lines. The modules are detachably connectable to a common bus which is permanently connected to a building ground wire.

19 Claims, 1 Drawing Sheet

MODULAR PRIMARY SURGE PROTECTOR ASSEMBLY

BACKGROUND OF THE INVENTION

The present invention relates to surge protectors which protect electrical equipment connected to electrical lines, such as alternating current (AC) power lines, telephone lines, data lines and coaxial cable lines, from electrical surges. The present invention relates more particularly to primary surge protectors which are generally located where electrical lines enter a building.

DESCRIPTION OF THE RELATED ART

Electrical lines, such as AC power lines, telephone lines, data lines and coaxial cable lines, are subject to accidental power surges. These power surges are a condition wherein an abnormally high current and/or voltage is transmitted over the electrical line. Power surges can be caused by lightning or short circuits. The surge can cause permanent damage to devices connected to the electrical line.

Therefore, surge protectors have been developed to detect surges and to block the surge before it reaches devices on the electrical line. Roughly speaking, surge protectors are divided into two different types—primary and secondary.

Primary surge protectors are generally located where electrical lines enter a building. These surge protectors are designed with a relatively large "surge capability" so that they can protect against relatively large surges. Because primary surge protectors are located where lines enter a building, they can protect the portions of the lines which run inside the building (such as lines within the walls of the building) as well as devices which are located on the lines. Another feature of primary surge protectors is that, because of their location, they can be grounded by building ground wires. Building ground wires have good connection to the Earth itself, and therefore can provide excellent grounding for large surges.

Secondary surge protectors, on the other hand, are generally located on the inside of a building. For instance, it is common to place a secondary surge protector on an AC power line between a wall outlet and a computer. Because they are generally located indoors, secondary surge protectors are not generally required to be as rugged as primary surge protectors. Secondary surge protectors typically have a lower "surge capability" than primary surge protectors.

The two types of surge protectors, primary and secondary, are each further sub-divided into surge protectors for each type of electrical line. The various types of electrical lines have different constructions, different kinds of interfacing hardware and are subject to different types of surges. Furthermore, the various types of electrical lines typically follow different paths within a building. For instance, telephone lines run to telephone jacks, while AC power lines run to power outlets.

For these reasons, there are different types of surge protectors for different types of electrical lines. For instance, there are AC power line primary surge protectors, co-axial cable primary surge protectors, and telephone line primary surge protectors. Buildings may have one or more of these different types of surge protectors at the location(s) where each type of electrical line enters the building.

As more expensive electronic devices are added to a building, it becomes more desirable to add primary surge protectors for additional types of electrical lines to sufficiently protect the devices. Unfortunately, it can be laborintensive process to find the appropriate location to add the primary surge protector, to determine whether an appropriate primary surge protector is already in place, and to mechanically mount primary surge protectors which are to be added.

SUMMARY OF THE INVENTION

It is an object of the present invention to provide a modular primary surge protector. It is a further object of the present invention to provide a modular primary surge protector which is directly attached to the ground wire of a building through a common bus. It is a further object of the present invention to provide a modular primary surge protector located at the point where wires enter a building. It is a further object of the present invention to provide a primary surge protector wherein primary surge protection for different types of electrical lines can be quickly and easily added or removed.

According to the present invention, a modular primary surge connector assembly provides surge protection for at least two types of electrical lines, such as AC power type electrical lines, telecommunications electrical lines, or co-axial cable type lines. The modular primary surge protector assembly includes a common bus directly connectable to a ground wire of a building. The common bus is generally permanently connected to the building ground wire. First and second modules are detachably connected to the common bus. The first and second modules are also detachably connectable to each other.

The first module provides primary surge protection for a first type of electrical line using grounding provided by the common bus and building ground wire. The second module provides primary surge protection for a second type of electrical line, which is different than the first type of electrical line, using grounding provided by the common bus and building ground wire. For instance, the first module may provide surge protection for an AC power line, while the second module may provide surge protection for a telecommunications line.

DETAILED DESCRIPTION OF THE PREFERRED EMBODIMENTS

Figure 1:
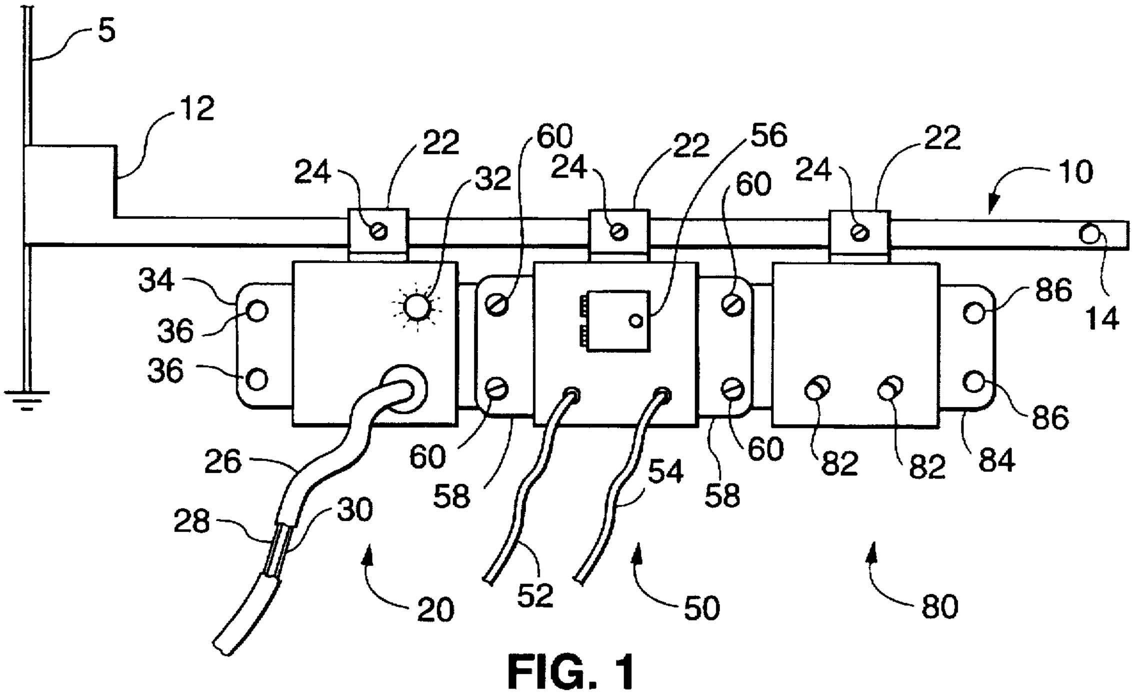
FIG. 1 is an orthogonal view of a modular primary surge protector assembly according to the present invention.

FIG. 1 shows a modular primary surge protector assembly mounted to the wall of a building. Three modules 20, 50, 80 are each connected to a common bus 10. The common bus 10 terminates at one of its ends in a connector 12, which is permanently connected by hard-wiring to a building ground 5. Because the connector 12 is connected to the building ground 5, it is preferable to place the modular primary surge connector assembly on the wall close to the building ground. Preferably, the modular primary surge protector assembly should be placed within 2 meters of the building ground.

The building ground provides an excellent ground, capable of grounding large electrical surges. More specifically, the closer a module is to the building ground, the lower the inductance of the grounding (ground path) for the module. This lower inductance means that the module will have a lower effective limiting voltage, thereby providing better grounding capability. For instance, by connecting modules 20, 50, 80 directly to the building ground wire through a common bus it is possible to achieve an inductance of less than 0.3 microhenries for each of the modules. This low inductance results in a low limiting voltage for each of the modules 20, 50, 80, and better surge protection.

The assembly should also be placed as close as possible to the point where lines (e.g., AC, telecommunications, co-axial cable) to be surge protected enter the building. Preferably, the modular primary surge protector assembly should be placed within 2 meters of the point where lines (e.g., AC, telecommunications, co-axial cable) enter the building. The modules 20, 50, 80 are designed to be connected directly to lines which enter the building from the outside.

Because the modules 20, 50, 80 share the common bus 10, only one bus is required to connect the modules 20, 50, 80 to the building ground, instead of three separate busses. Furthermore, because all the modules 20, 50, 80 are connected to a common bus 10 and are in the same place, it is easy to evaluate which types of electrical lines have primary module surge protection in place at any given time by just locating the modular primary surge assembly.

Because the modular primary surge protector assembly is generally located on a wall of a building, and possibly even on an exterior surface of the wall, the modules 20, 50, 80 should be sufficiently rugged to withstand exposure to the elements. For instance, depending on the application, the modules 20, 50, 80 can be constructed to meet National Electrical Manufacturers Association (NEMA) or Underwriters Laboratory (UL) standards, such as NEMA standard 1–10–1979 Type 4 or 4X. In this way, sufficient protection can be ensured against conditions such as windblown dust, rain, splashing water, hose-directed water, and/or ice formation.

The common bus 10 has several holes 14 so that it can be connected by screws 24 to the surge protector modules 20, 50, 80. The holes can be placed according to the dimensions of the modules which share the bus. Alternatively, the modules 20, 50, 80 can be connected to the common bus 10 by a pigtail wire connection, clips or other means.

Figure 2:
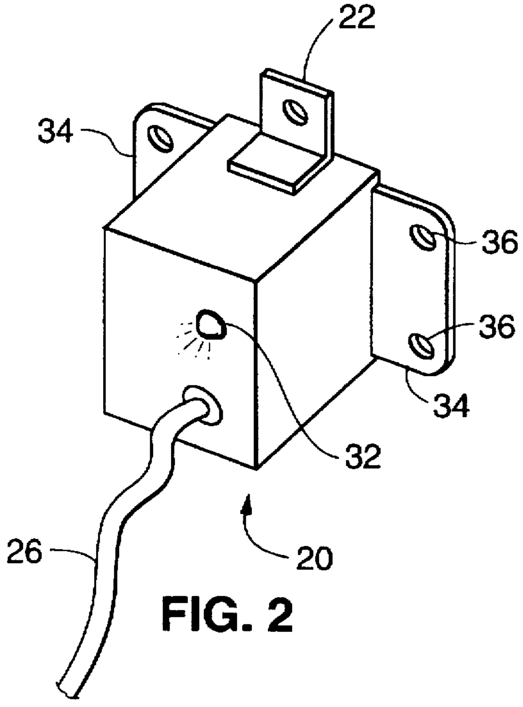
FIG. 2 is a perspective view of a first embodiment AC surge protector module.

As shown in FIG. 1, an AC module 20 is connected to the common bus 10 by means of a bus connector 22 and screw 24. The common bus 10 may be mounted to the wall. The screw 24 may also pass into the wall. In these ways, the connection between the AC module 20 and the common bus can help support the AC module 20 on the wall. The geometry of the AC modular surge protector is shown in a perspective view in FIG. 2.

The AC module 20 is designed to provide primary module surge protection for alternating current lines which are led into the building from the outside. An AC line 28 is protected by insulative sheath 26 and is led from the AC panel (not shown) of the building into the AC module 20.

Inside the module, primary AC surge protection is provided according to any of the conventional methods. The surge protection should be great enough to protect against surges caused by lightning and other surges which may occur at the point where an AC power line enters a building. This high surge capability is facilitated because the AC module 20 is connected to the building ground (via the common bus 10). For example, the AC module 20 is preferably constructed to provide a rated surge capability of greater than 10 kilovolts (kV) open circuit and 20,000 amperes short circuit. More specifically, the AC module is preferably constructed to provide a rated surge capability of greater than 10 kV open circuit and 20,000 amperes short circuit of the IEEE waveform (8 microsecond rise, 20 microsecond fall under short-circuit conditions). Preferably, the AC module should be able to withstand and limit surges in excess of 10 kV, with an available current of 20 kA.

After being led through the surge protection circuitry (not shown) inside the AC module 20, the return AC line 30 is led back to the AC panel (not shown) within the insulative sheath 26.

AC module 20 has an indicator light 32 to indicate predetermined conditions inside the module 20. Such indicator lights can be useful to indicate conditions such as power confirmation, protection intact, protection impaired, over/under voltage, or phase fault.

The AC module 20 has flanges 34 with holes 36 (see FIG. 2) so that the AC module 20 can be detachably connected to the wall and to other modules (e.g. module 50) by means of screws 60. Because AC module 20 can be detachably connected to other modules, it is easy to add or remove the AC module 20 from the modular primary surge connection assembly. Furthermore, since it easy to add or remove modules from the assembly, modules can be easily replaced or upgraded as desired without replacing the entire assembly.

Module 50 is a telecommunications surge protector connected to the common bus 10 by bus connector 22 and screw 24 as shown. Phone wire 52 is led from the outside of the building directly into the telecommunications module 50.

Inside the telecommunications module 50, primary surge protection appropriate for a telecommunication line is provided. Preferably, the telecommunications module 50 should be able to withstand repeated surges of at least 2,000 amperes. For a given application, the surge protection of telecommunications module 50 should be sufficient to meet any applicable government or private standards, such as Underwriter's Laboratory Standard No. 497.

Preferably, the telecommunications module 50 should "fail closed". This means that the telecommunications module 50 should connect all active (signal) terminals to ground in the event of sustained overload.

Phone wire 54 leads the telecommunications line from the telecommunications module 50 to the telephones, facsimile machines or computer modem devices inside the building. Because it is common to have multiple telecommunications lines for a single building, the module 50 can be constructed to accommodate more than one telecommunications line. Alternatively, more than one telecommunications module 50 can be added to the modular primary surge protector assembly to accommodate additional lines. This approach is facilitated by the fact that it is easy to add or remove modules to the assembly.

Telecommunications module 50 has flanges 58 with holes for connection to other modules 20, 80 and the wall by means of screws 60. The screws pass through holes in the flanges 34, 58, 84 as shown in FIG. 1, and into the wall to securely mount the module. The flanges 34, 58, 84 should be shaped and located on their respective modules 20, 50, 80 so that the flanges abut, but do not interfere with each other when the modules are mounted by the screws 60.

Telecommunications module 50 also has a hinged access door 56. This kind of access door 56 may be provided on modules as desired to allow access to the circuitry inside of the module.

Module 80 is a co-axial cable surge protector connected to the common bus 10 by bus connector 22 and screw 24 as shown. Co-axial cable module 80 has terminals 82 for connection to a co-axial cable line which is led from outside the building to the module 80, and then from the module 80 to co-axial cable devices (such as cable televisions) inside the building.

Inside the co-axial cable module 80, primary surge protection appropriate for a co-axial cable line is provided. The surge protection should have adequate capacity to suppress any electrical overvoltage expected at the building entrance under lightning or AC power fault conditions. Preferably, the co-axial cable module 80 should be able to withstand repeated surges of at least 2,000 amperes. For a given application, the surge protection of co-axial cable module 80 should be sufficient to meet any applicable government or private standards.

As shown in FIG. 1, co-axial cable module 80 has flanges 84 with holes 86 to provide for detachable connection to other modules (i.e., module 50) and to the wall by screws 60 as previously described.

Because of the proximity of the modular primary surge protector assembly to the building ground wire, a high degree of surge protection, from surge caused by conditions such as lightning or AC power fault conditions, can be provided by the modules 20, 50, 80. The proximity of the modular surge connector assembly to the building ground wire minimizes the potential difference between the protector ground and the building ground.

Furthermore, because of the proximity of the modular primary surge connector assembly to the location at which AC power lines, telecommunications lines and/or co-axial cable lines enter the building, surge protection can be accomplished before a surge damages devices in the building, portions of lines which run inside the walls of the building, or the building itself.

Figure 3:
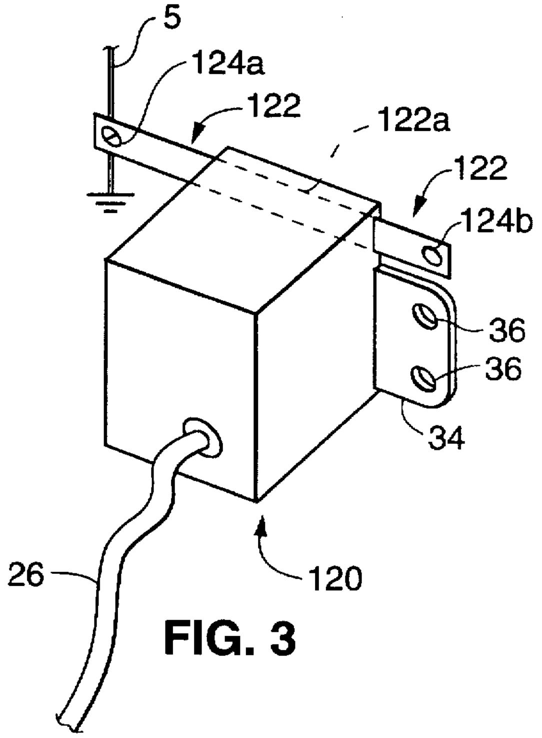
FIG. 3 is a perspective view of a second embodiment AC surge protector module.

A second embodiment for a module 120 is shown in FIG. 3. Parts of the module 120 which are similar to module 20 (described above) are denoted by the same reference numerals, and explanation of these parts is omitted. Module 120 includes a common bus portion 122. Part of the common bus portion 122*a* is enclosed in the housing of the module.

One end 124*a* of the common bus portion is detachably connectable to the building ground wire 5. Module 120 is grounded through the common bus portion 122 to the building ground wire. The other end 124*b* is detachably connectable to the common bus portion of another similar module (not shown). Several modules 120, can be assembled to provide a common bus 122 which extends through each of the modules 120 and provides a grounding connection between the modules 120 and the building ground wire 5.

While preferred embodiments of the present invention have been described above using illustrative examples, it will be understood by those skilled in the art that the invention is not limited by the illustrative examples and that various changes and modifications may be made without departing from the spirit or scope of the invention as set forth in the following claims.

What is claimed is:

1. A modular primary surge protector assembly for providing surge protection for at least two types of electrical lines comprising:

a common bus directly connectable to a building ground and having at least two module-connecting holes therein;

a first module including a bus connector that detachable connects the first module to the common bus at one of the module-connecting holes, wherein the first module provides primary surge protection for a first type of electrical line using grounding provided by the common bus and building ground; and a second module including a bus connector that detachable connects the second module to the common bus at one of the module-connecting holes, wherein the second module includes means detachably connecting the second module to the first module, wherein the second module provides primary surge protection for a second type of electrical line, which is different than the first type of electrical line, using grounding provided by the common bus and the building ground.

2. The modular primary surge protector assembly according to claim 1, wherein the first type of electrical line is an AC power line, and the second type of electrical line is a telecommunications line.

3. The modular primary surge protector assembly according to claim 1, wherein the first type of electrical line is an AC power line, and the second type of electrical line is a co-axial cable line.

4. The modular primary surge protector assembly according to claim 1, wherein the first type of electrical line is a telecommunications line, and the second type of electrical line is a co-axial cable line.

5. The modular primary surge protector assembly according to claim 1, wherein the first type of electrical line is an AC power line, and the first module provides AC power surge protection having a rated surge capability of greater than 10 kilovolts open circuit and 20,000 amperes short circuit.

6. The modular primary surge protector assembly according to claim 1, wherein the first type of electrical line is a co-axial cable line, and the first module is able to withstand repeated surges of at least 2000 amperes.

7. The modular primary surge protector assembly according to claim 1, wherein the first type of electrical line is a telecommunications line, and the first module is able to withstand repeated surges of at least 2000 amperes.

8. The modular primary surge protector assembly according to claim 1, wherein the first type of electrical line is a telecommunications line, and the first module fails closed.

9. The modular primary surge protector assembly according to claim 1, wherein:

the first module includes means for detachably connecting the first module to a wall of the building; and the second module includes means for detachably connecting the second module to a wall of the building.

10. A modular primary surge protector assembly for providing surge protection for a building for at least two types of electrical lines comprising:

a building ground;

a common bus permanently connected to the building ground and having at least two module-connecting holes therein;

a first module including a bus connector that detachably connects the first module to the common bus at one of the module-connecting holes, wherein the first module provides primary surge protection for a first type of electrical line using grounding provided by the common bus and building ground; and a second module including a bus connector that detachable connects the second module to the common bus at one of the module-connecting holes, wherein the second module includes means detachably connecting the second module to the first module, wherein the second module provides primary surge protection for a second type of electrical line, which is different than the first type of electrical line, using grounding provided by the common bus and building ground.

11. The modular primary surge protector assembly according to claim 10, wherein:

the inductance between the first module and the building ground is less than 0.3 microhenries; and the inductance between the second module and the building ground is less than 0.3 microhenries.

12. The modular primary surge protector assembly according to claim 10, wherein the first module and second module are located close to the building ground.

13. The modular primary surge protector assembly according to claim 12, wherein the first module and second module are located within 2 meters of the building ground.

14. The modular primary surge protector assembly according to claim 10, wherein the modular primary surge protector assembly is located close to a location where the first type of electrical line enters the building and close to a location where the second type of electrical line enters the building.

15. The modular primary surge protector assembly according to claim 14, wherein the modular primary surge protector assembly is located within 2 meters of the location where the first type of electrical line enters the building and within 2 meters of the location where the second type of electrical line enters the building.

16. A modular primary surge protector assembly for providing surge protection for at least two types of electrical lines comprising:

a first module, having a first common bus portion which is detachably connectable to a building ground, the first module providing primary surge protection for a first type of electrical line using grounding provided by the building ground through the first common bus portion; and a second module, having a second common bus portion including means for detachably connecting the second common bus portion to the first common bus portion, the second module including means detachably connecting the second module to the first module, and the second module providing primary surge protection for a second type of electrical line, which is different than the first type of electrical line, using grounding provided by the building ground through the second common bus portion and the first common bus portion.

17. The modular primary surge connector assembly according to claim 16, wherein:

the first module comprises a first housing and the first common bus portion is partially enclosed in the first housing; and the second module comprises a second housing and the second common bus portion is partially enclosed in the second housing.

18. The modular primary surge protector assembly according to claim 17, wherein:

the inductance between the first module and the building ground is less than 0.3 microhenries; and the inductance between the second module and the building ground is less than 0.3 microhenries.

19. A modular primary surge protector assembly for providing surge protection for a building for at least two types of electrical lines comprising:

a building ground;

a first module, having a first common bus portion which is detachably connectable to the building ground, the first module providing primary surge protection for a first type of electrical line using grounding provided by the building ground through the first common bus portion; and a second module, having a second common bus portion including means for detachably connecting the second common bus portion to the first common bus portion, the second module including means detachably connecting the second module to the first module, and the second module providing primary surge protection for a second type of electrical line, which is different than the first type of electrical line, using grounding provided by the building ground through the second common bus portion and the first common bus portion.

* * * * *